(12) United States Patent
Lilborn (10) Patent No.: US 7,752,805 B2
(45) Date of Patent: Jul. 13, 2010

(54) STRUCTURE AND METHOD FOR ENABLING TREE ROOT GROWTH BENEATH ADJACENT SURFACES

(76) Inventor: Donna Lilborn, 10 Mountain St., Haydenville, MA (US) 01039

( * ) Notice: Subject to any disclaimer, the term of this patent is extended or adjusted under 35 U.S.C. 154(b) by 707 days.

(21) Appl. No.: 11/646,144

(22) Filed: Dec. 27, 2006

(65) Prior Publication Data

US 2008/0155891 A1   Jul. 3, 2008

(51) Int. Cl.
*A01G 13/02*   (2006.01)
(52) U.S. Cl. ............................................. 47/32.7; 47/32
(58) Field of Classification Search ................. 47/32.7, 47/32.8, 32, 32.3, 33, 31.1, 20.1, 32.4, 29.2
See application file for complete search history.

(56) References Cited

U.S. PATENT DOCUMENTS

| | | | |
|---|---|---|---|
| 2,174,035 A | 9/1939 | Henderson | |
| 3,990,181 A | 11/1976 | do Valle | |
| 4,019,279 A | 4/1977 | Moorman et al. | |
| 4,376,595 A | 3/1983 | Shaw | |
| 4,665,645 A | 5/1987 | Schau, III et al. | |
| 4,771,572 A | 9/1988 | Higa | |
| 5,070,642 A | 12/1991 | Albrecht | |
| 5,383,302 A | 1/1995 | Hill | |
| 5,442,891 A * | 8/1995 | Albrecht | 52/745.14 |
| 5,839,852 A | 11/1998 | Mattson | |
| 6,277,274 B1 | 8/2001 | Coffman | |
| 6,540,436 B2 | 4/2003 | Ogi | |
| 7,080,480 B2 | 7/2006 | Urban et al. | |
| 7,207,137 B2 * | 4/2007 | Wagner | 47/32.4 |

FOREIGN PATENT DOCUMENTS

DE     3543861     * 10/1986

* cited by examiner

*Primary Examiner*—T. Nguyen
(74) *Attorney, Agent, or Firm*—McCormick, Paulding & Huber LLP (57) ABSTRACT

A walkway adjacent trees is made up of modular sections of perforated plates supported on hinged frames that are supported on spaced piers. Retaining edges of biodegradable material serve to maintain a shallow trench beneath the perforated plates into which leaves or mulch are periodically added. This provides a root-friendly zone under the walkway for tree roots that are watered through the perforated plates and may grow without damaging the walkway. A fringe of plantings maintains the trench level when the biodegradable material disintegrates.

12 Claims, 6 Drawing Sheets

STRUCTURE AND METHOD FOR ENABLING TREE ROOT GROWTH BENEATH ADJACENT SURFACES

BACKGROUND OF THE INVENTION

This invention relates to landscape architecture and to a structure and method for designing walkways and vehicle traffic areas that promote the growth of trees and other vegetation in close proximity thereto so as to enhance their overall utility and beauty.

Trees and adjacent hardscape surfaces are mutually incompatible. The hardscape surfaces, defined here as load-bearing, generally impervious, surfaces, such as concrete sidewalks, parking lots, and driveways that are necessary for the convenience of humans are usually supported on compacted soil or fill. Trees and similar vegetation, on the other hand, require nutrients and water, and send forth an extensive root structure in search of these elements that are essential to growth of the tree. The structural root system is destructive to the hardscape surface over time. The compacted soil beneath the hardscape stunts the growth of the root system and the growth of the tree.

There have been many proposals to solve the problem, which are unfriendly to tree root growth. These comprise "root barrier" systems that place an impenetrable, permanent shield between the tree roots and the subsurface beneath the hardscape. Exemplary of these "root barrier" systems are U.S. Pat. No. 4,019,279 issued Apr. 26, 1977 to Moorman and U.S. Pat. No. 5,070,642 issued Dec. 10, 1991 to Albrecht, which are cited to show well-known permanent root barrier or deflector systems protecting an adjacent, non-permeable hardscape.

A system that seeks to promote the growth of tree roots beneath an adjacent hardscape is seen in U.S. Pat. No. 7,080, 480 issued Jul. 25, 2006 to Urban, et al. Urban discloses a structural cell system comprising a matrix of load-bearing cells of concrete composites or plastic stacked in horizontal layers with permeable barriers separating the layers into three groups. The cells are of an open design to allow water, soil and/or roots to penetrate. The center group has soil-filled cells while upper and lower groups are for short term and long-term water storage respectively. Tree root growth takes place in the center group filled with low compacted soil. The system is designed to capture storm water and pipe it to the upper and lower groups of stacked structural cells which serve to perform a load-bearing function to support the hardscape above. The system is designed to be installed under impervious hardscape such as sidewalk, parking or roadway pavement but may also be used under permeable hardscapes such as turf, planting beds or compacted soil. In either case, the hardscape is a permanent surface structure, requiring inspection ports, overflow pipes and soil injection pipes in order to reach the layers of structural cells below. Many layers of structural cells stacked on top of one another are required when using the aforementioned Urban system and there is no convenient way to augment the contents of the soil-filled root growing cells except through one or more soil injection ports.

A modified root barrier system is shown in U.S. Pat. No. 5,383,302 issued Jan. 24, 1995 to Hill, which describes a combination tree root disbursement system and tree root barrier system. An inner cylindrical structure with openings surrounds the root ball and an outer barrier structure is spaced from the inner structure to protect an adjacent concrete hardscape. The openings are designed to promote some horizontal growth through the openings. However, a permanent barrier prevents horizontal root growth beneath the adjacent non-permeable hardscape.

It would be desirable to have an inexpensive method and structure for controlling and enabling tree root growth adjacent a walkway or similar load-bearing surface. It would also be desirable to have a convenient way to periodically nourish the root growth zone with mulch, nutrients, loose loam, water and other elements necessary to healthy tree root growth. Furthermore, it would be desirable to plant trees adjacent a hardscape with an inexpensive root-friendly substructure beneath it that allows tree roots to gradually establish themselves over time, extending roots into the substructure.

Accordingly, one object of the present invention is to provide an improved method and structure for enabling tree root growth beneath adjacent load-bearing surfaces.

Another object of the invention is to provide a structure and method for periodically nourishing a tree root growth zone with elements necessary to healthy tree root growth.

Another object of the invention is provide a structure and method for laying out trees, walkways or parking areas with an inexpensive root-friendly substructure beneath the walkways or parking areas.

Another object of the invention is to provide a walkway with a root-friendly substructure to be located adjacent to trees that allows the tree roots to gradually establish themselves over time, extending roots into the root-friendly substructure.

SUMMARY OF THE INVENTION

Briefly stated, the invention in its simplest form comprises a structure for enabling tree root growth beneath a walkway adjacent to at least one tree having roots planted in soil, comprising a first row of spaced support piers disposed near said tree within reach of tree root growth and defining one side of the walkway, a second row of spaced support piers defining the other side of the walkway, a shallow trench extending along the walkway between the rows of piers, the shallow trench having sidewalls extending to a selected depth below the level of said soil, a retaining edge temporarily maintaining the selected depth, a cover member supported on selected piers and having a load-bearing surface covering a portion of the shallow trench, said load-bearing surface being permeable so as to allow water to percolate therethrough upon the soil, the cover member being movable so as to temporarily allow access for adding nourishing elements to the soil.

The invention also comprises the method of periodically removing the load bearing cover and adding a composting layer of leaves or mulch.

A preferred embodiment of the invention utilizes a walkway comprising a series of load-bearing, water pervious covers comprising perforated sheets supported by frames resting on the support piers. The frames are hinged so that they can be opened to receive leaves or mulch maintained at a selected level in a shallow trench beneath the perforated sheet. Biodegradable retaining edges of wood or similar material that will disintegrate over time serve as temporary sidewalls for the trench and maintain the level of the trench below ground level at the side of the walkway. Stabilizing plants line the walkway. After the roots of the stabilizing plants become established they maintain the difference in level between the trench and the surrounding soil. The tree roots grow into the space under the trench and are nourished from above by periodically opening the hinged covers and adding the leaves or mulch. Water is supplied by rainwater entering through the perforated sheets.

BRIEF DESCRIPTION OF THE DRAWINGS

The invention, both as to organization and method of practice, together with further objects and advantages thereof, will best be understood by reference to the following description, taken in connection with the accompanying drawings, in which.

DESCRIPTION OF THE PREFERRED EMBODIMENT

Figure 1:
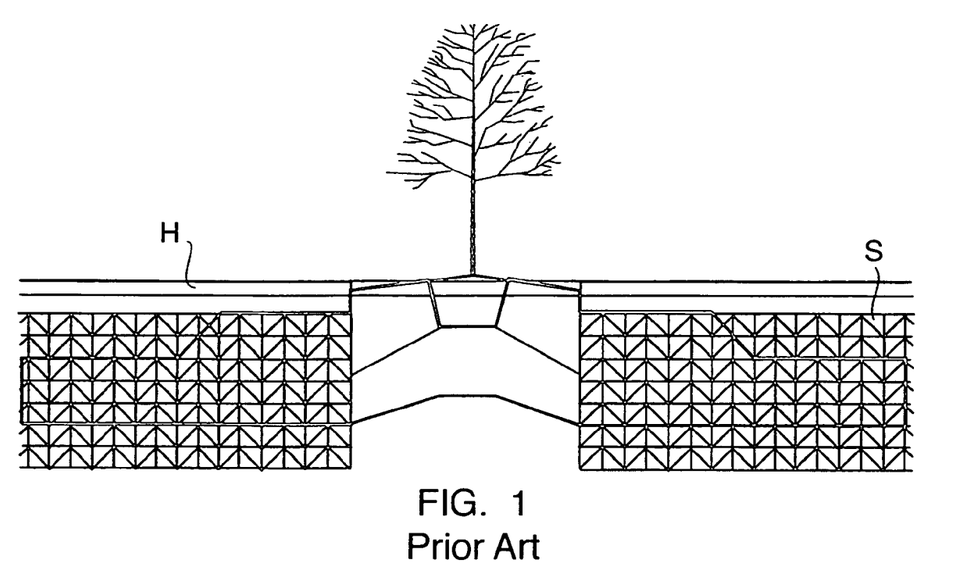
FIG. 1 is an elevation view, in cross-section, of a prior art integrated tree root and storm water system.
Figure 2:
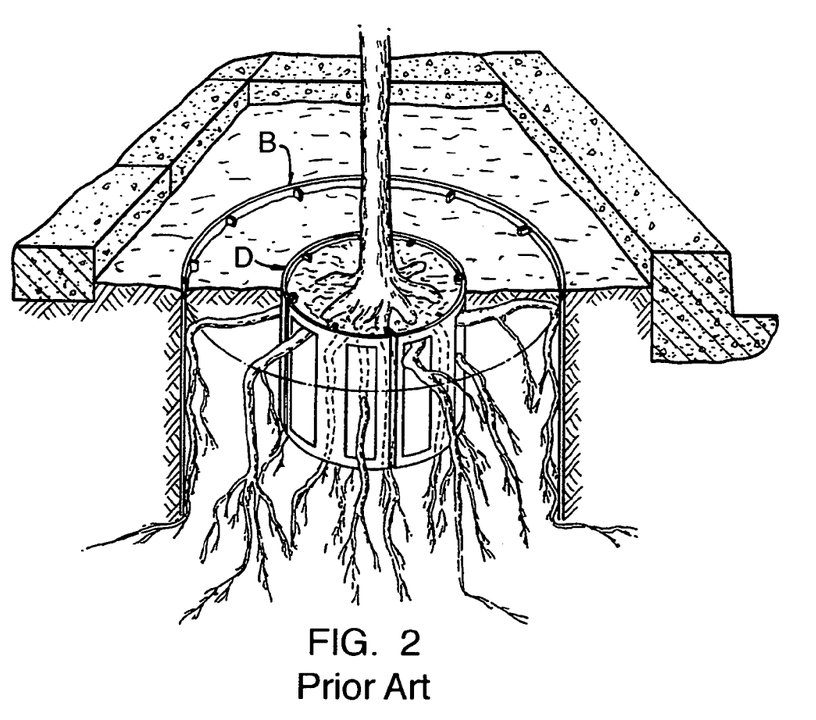
FIG. 2 is a perspective elevation view, partly in cross-section of a prior art apparatus and method for growing strongly-rooted trees and preventing root damage to hardscapes.

Referring to FIGS. 1 and 2 of the drawing, prior art systems for controlling and enhancing root growth adjacent to a hardscape are shown, as taken from the Urban et al and Hill patents referenced above.

In FIG. 1, a structural cell system is disclosed for supporting hardscape areas in a way that enables tree root growth and accommodates filtering, retention, storage and infiltration of storm water while preventing hardscape damage. The system includes a plurality of structural cells (S) capable of being positioned below a hardscape (H). The structural cells are designed to have openings that are sized to accept tree roots. The system has one or more permeable barriers around the structural cells with a way for water to flow into the plurality of structural cells and to flow out of the structural cells.

In FIG. 2, a root disbursement element (D) is provided around the root ball of a tree, being adapted to direct some of the roots from the root ball downwardly while permitting others to grow outwardly. In those numerous situations where there is a hardscape near the tree, a root-control barrier (B) is provided between the root disbursement element and the hardscape, in spaced relationship from the root disbursement element. The root-control barrier directs downwardly those roots that emanate outwardly from the disbursement element, to a depth sufficiently great that damage to the hardscape is prevented.

Figure 3A:
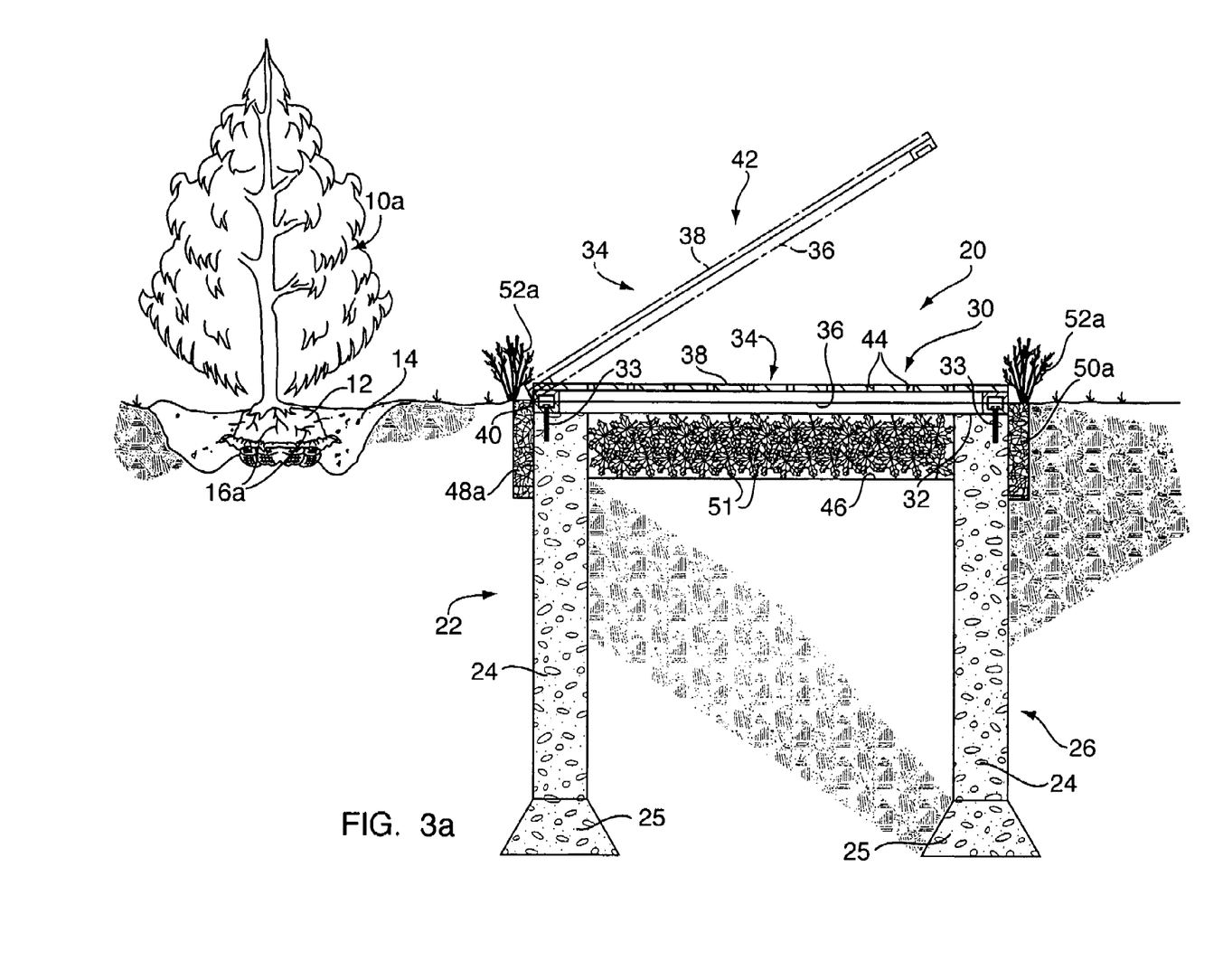
FIGS. 3a and 3b are elevation views, partly in cross-section, of a tree adjacent a walkway constructed in accordance with the present invention, shown at earlier and later time periods, respectively.

Referring now to FIG. 3a of the drawing a newly planted tree 10a is shown closely adjacent to a newly constructed walkway indicated generally at 20.

The tree 10a is transplanted from a tree nursery and having a root ball 12 that is supported in surrounding compacted soil 14. Newly established roots are shown at 16a extending beyond the root ball.

Walkway 20 is constructed by providing a first row 22 of support piers 24 disposed near tree 10a within reach of tree root growth and defining one side of walkway 20, and a second row 26 of spaced support piers 24 defining the other side of the walkway. The rows 22, 26 are spaced laterally apart from one another and may run straight to be connected with curved sections or follow a sinuous path as desired to accommodate the functional or aesthetic architectural landscape plan desired.

The support piers 24 may be of any conventional construction suitable for bearing a load in compression. They may be of poured concrete as depicted with footings 25, or alternatively of steel pipe set in footings, or alternatively can be steel pilings driven into the soil. The type of construction of the piers 24 is not material to the present invention.

Disposed on top of the piers 24 is a cover module, shown generally at 30. The cover module is made up of a lower frame 32 supported on and attached to selected piers 24 by anchor bolts 33, and a permeable cover member, shown generally at 34. The permeable cover member 34 is, in turn, comprised of an upper frame 36 attached to a permeable load-bearing sheet 38. The upper and lower frames 32, 36 are connected on one edge by one or more hinges 40, so as to allow the permeable cover member 34 to open, as seen in dotted line position 42.

Permeable load-bearing sheet 38 may be of any conventional material suitable for a walking surface, such as steel, aluminum, plastic, or wood treated to be weather resistant. The thickness of sheet 38 is chosen with regard to the construction of the underlying frames 32, 36, so that it will carry the expected load, be it casual walkers or vehicular traffic. Sheet 38 is provided with spaced perforations 44, which make the sheet permeable to air and water.

In accordance with the present invention, a shallow trench 46 is dug to extend along the walkway 20 between first and second rows 22, 26 of piers. Trench 46 has sidewalls between piers 24 that extend to a selected depth below the level of the soil on either side of walkway 20. The preferred depth is on the order of 6 inches, but may range between 4 and 8 inches or more depending on the type of soil 14 below the trench and depending upon how often material is added, as will be later explained.

Lastly, retaining edges 48a and 50a are placed so as to extend along walkway 20 on the outer sides of rows 22, 26 respectively. The retaining edges are of a vertical height so as to extend into the soil 14 to a greater depth than that of the shallow trench 46 so that they will serve as temporary sidewalls for trench 46. The retaining edges are of a thickness and of a material selected to be biodegradable over a pre-selected time period of 3 to 8 years, or about 5 years. A suitable material is conventional untreated (i.e., non-pressure-treated) lumber, such as fir or pine. Another suitable material is untreated interior plywood, particleboard or even multiple layers of corrugated cardboard. Also suitable are some plastics such as homoplastic material that will disintegrate over time.

The tops of piers are constructed so as to be substantially at ground level, so that when the cover member 34 is in place, there is a slight downward grade from the upper surface of the sheet 38 to the level of the surrounding soil 14. In this area are planted varieties of stabilizing plants 52a that run along either side of walkway 20 to stabilize the soil near the retaining edges 48a, 50a.

In accordance with the present invention, elements to nourish the soil 14 are periodically added into the shallow trench 46 beneath the perforated sheet 38. Preferably such elements simply comprise leaves 51 from adjoining trees. This accomplishes a dual purpose of providing the rotting leaves as mulch for the underlying soil and also ridding the surrounding area of leaves. However, other nourishing elements added may comprise wood chips, leaf mulch or organic or inorganic fertilizers.

Figure 3B:
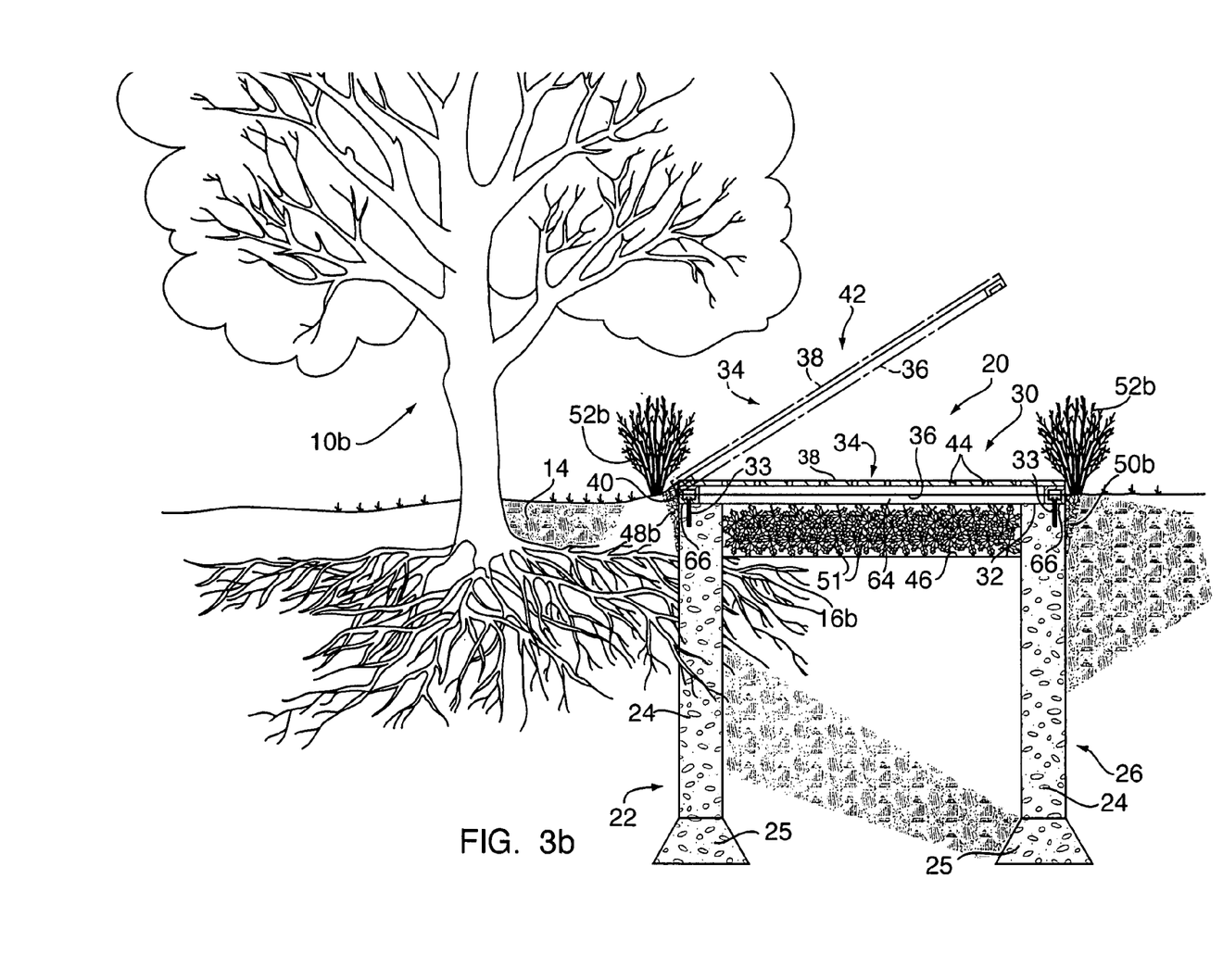

Referring now to FIG. 3b of the drawing the same structures as in FIG. 3a are shown, and which have the same reference numbers as in FIG. 3a, with the exception of those indicated below. A time period of about 5 years has passed. The retaining edges, now indicated as 48b, 50b have partially or totally disintegrated. Their function of maintaining a difference in level between that of trench 46 and surrounding soil has been replaced by the roots of stabilizing plants 52b.

The tree is shown at 10b and has grown in size so that its roots 16b extend through the spaces between piers 24 and into the soil beneath the walkway 20. The roots are nourished by the leaf mulch and by air and periodic rainwater percolating through the perforations in the sheet 38.

Figure 4:
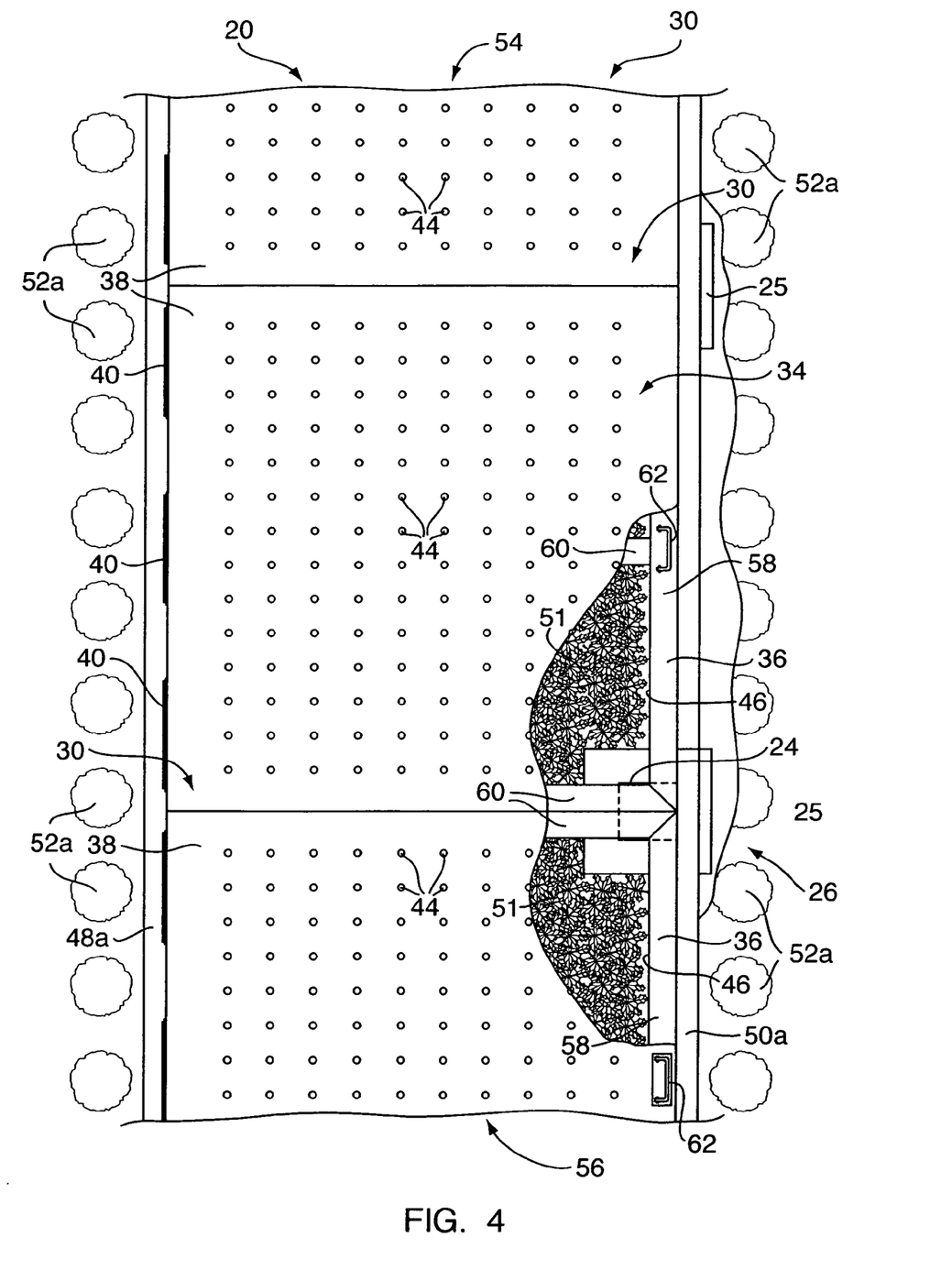
FIG. 4 is a plan view of the walkway of FIG. 3a according to the present invention, showing portions of connecting modular units.

Referring to the plan view of FIG. 4, the piers 24 are spaced along the trench so that piers support the corners of cover members 34, as well as intermediate portions of the lower frame 32. Portions of adjacent cover members are seen at 54 and 56. In order to provide economical construction the cover members are preferably all of the same length, Similarly, if the walkway is curved, the cover members preferably have the same length and curvature.

Portions of the sheet 38 have been cut away to show that the upper frame 36 consists of longitudinal members 58 and cross members 60. A recessed handle 62 is attached to a longitudinal member to assist in raising the sheet and upper frame on the hinges 40.

Spanning the trench 46 and supported on piers 24 is the lower frame 32 comprising load-bearing cross members 64 and load-bearing longitudinal members 66 (see FIG. 3b). Support frame 36 is preferably of structural steel, but could also be made of plastic or wood.

The cover member 34 is provided with a handle 62 that is attached to one of the upper frame longitudinal members 58 and recessed into the perforated plate.

Figure 5:
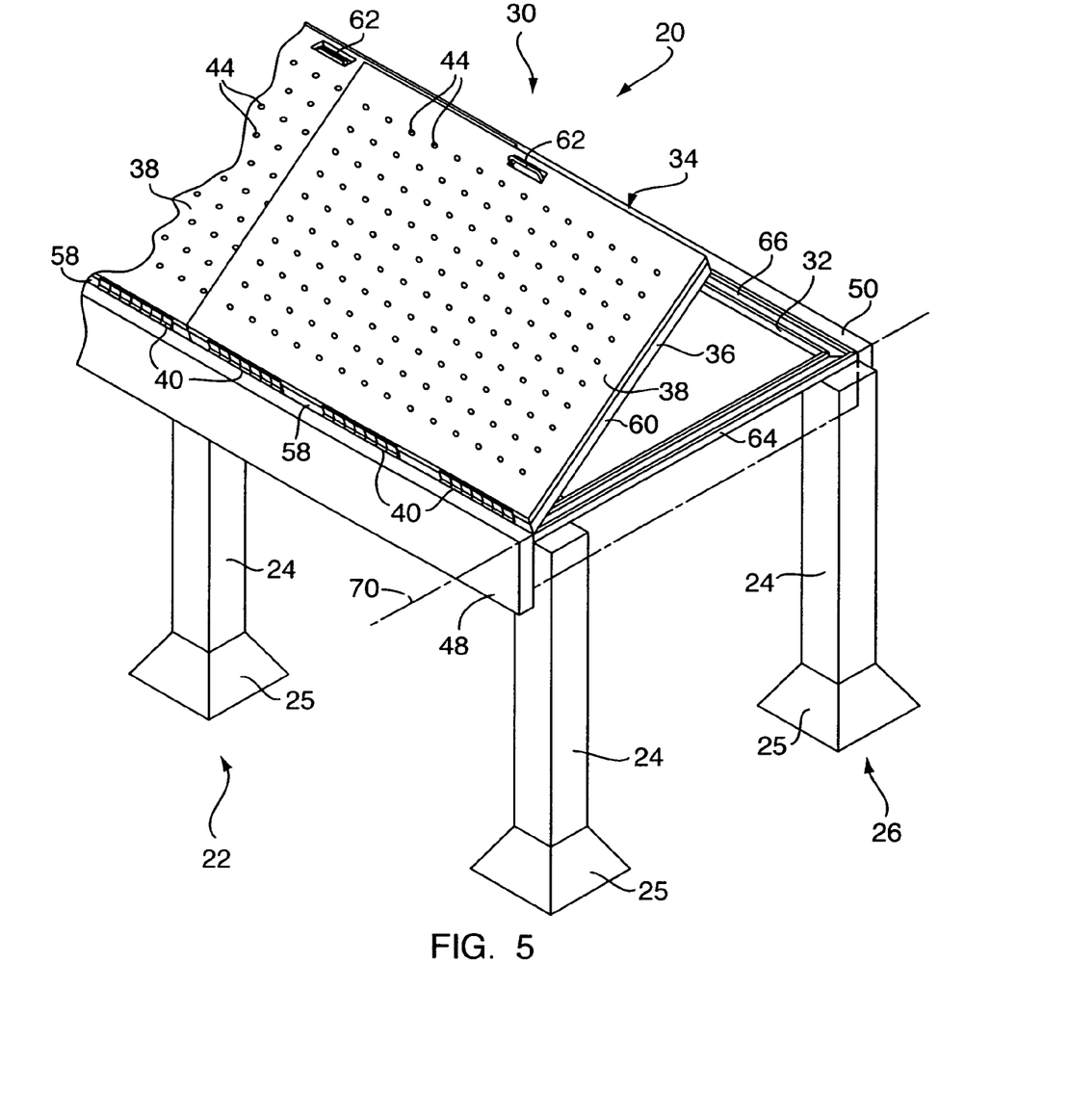
FIG. 5 is a perspective view of a modular walkway unit with soil omitted and with its hinged cover shown partially open.

FIG. 5 of the drawing is a perspective view of a single module 30 supported on 4 piers 24 with soil omitted so as not to obscure the construction. Cover member 34 is shown partly open, by using handle 62 to pivot the cover on hinges 40. Temporary retaining edges are indicated at 48 and 50. The dotted line 70 indicates the difference in level between the surrounding soil and the bottom of the shallow trench that is maintained by retaining edges 48 and 50.

While the preferred embodiment employs hinges attached between upper and lower frame members, the invention also contemplates a cover member that is not attached to the lower frame member, but having projections received within pockets in the lower frame, the upper frame being maintained in place by its weight as it is raised. In such a case, the cover member may be completely removed and set to one side, if desired.

Modification

Figure 6:
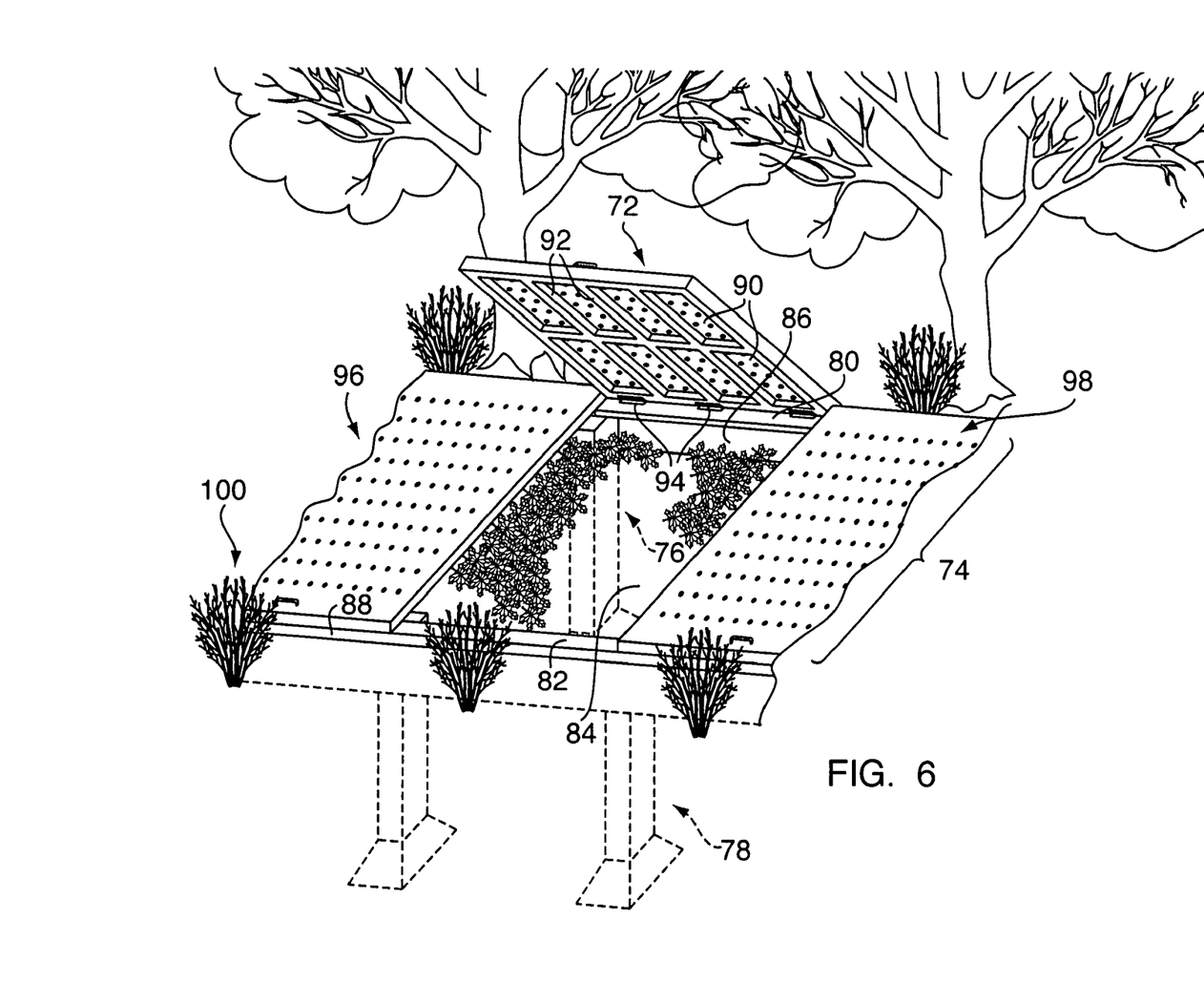
FIG. 6 is a perspective view of a modified modular walkway unit viewed from the underside of a modified cover member.

While the preferred embodiment of the invention uses a perforated sheet supported by a separate upper frame for the cover member 34, it is also within the scope of the invention to substitute a plastic molding with a perforated plate and integral strengthening ribs beneath the sheet that perform the function of the upper frame. FIG. 6 shows such a modified cover member partially opened along a walkway 74. Walkway 74 is defined between a first row of spaced piers 76 and second row of spaced piers 78. Longitudinal support beams 80, 82 are attached to the tops of the piers 76, 78 respectively.

Between the piers is a shallow trench 84 dug at a lower level than the surrounding soil. Biodegradable retaining edges 86, 88 are seen, which maintain the level of the bottom of the trench below that of the surrounding soil.

Cover member 72 is preferably a plastic molding having perforated flat sections 90 reinforced by strengthening ribs 92 on the underside. The plastic material provides a suitable walking surface on the flat upper side when the cover 72 is lowered on hinges 94. Adjacent module cover members are partially seen at 96, 98. Plants 100 line the walkway and their root system maintains the intended difference in ground level between shallow trench and surrounding soil after the retaining edge biodegrades.

While the term "walkway" has been used throughout, the invention contemplates a broader interpretation of the term "walkway" to include a roadway or a parking area for vehicular traffic as well as for pedestrians. It will be apparent to those skilled in the art that this merely involves a more substantial structure for the cover member and supporting piers.

While there has been described what is considered to be the preferred embodiment of the invention, other modifications will occur to those skilled in the art. It is desired to secure in the appended claims all such modifications as fall within the true spirit and scope of the invention.

The invention claimed is:

1. A structure for enabling tree root growth beneath a walkway adjacent to at least one tree having roots planted in soil, said structure comprising:
    a first row of spaced support piers disposed near said at least one tree within reach of tree root growth and defining one side of said walkway,
    a second row of spaced support piers defining the other side of said walkway, said second row of support piers being positioned adjacent to the first row of support piers on a side thereof away from said at least one tree,
    a shallow trench extending between said first and second rows and generally along said walkway, said shallow trench having sidewalls extending to a first selected depth below the level of said soil, and
    a cover member supported on selected piers, said cover member having a load-bearing walkway surface covering a portion of said shallow trench and being permeable so as to allow water to percolate therethrough upon soil under the shallow trench, said cover member being movable so as to temporarily allow access to the shallow trench under the walkway surface for adding nourishing elements to the shallow trench for enriching the soil thereunder.

2. The structure according to claim 1 and further including at least one temporary retaining edge adjacent at least one row of said first or second rows of spaced support piers and extending down into said soil to a second selected depth greater than said first selected depth below the soil level so as to temporarily serve as a shallow trench sidewall.

3. The structure according to claim 2, wherein said at least one temporary retaining edge is comprised of material that is biodegradable over time.

4. The structure according to claim 1 wherein said permeable cover member comprises a perforated sheet.

5. A structure for enabling tree root growth beneath a walkway adjacent to at least one tree having roots planted in soil, said structure comprising:
    a first row of spaced support piers disposed near said at least one tree within reach of tree root growth and defining one side of said walkway,
    a second row of spaced support piers defining the other side of said walkway, said second row of support piers being positioned adjacent to the first row of support piers on a side thereof away from said at least one tree, a shallow trench extending between said first and second rows and generally along said walkway, said shallow trench having sidewalls extending to a first selected depth below the level of said soil, a plurality of load-bearing members supported on selected piers, and a cover member having a load-bearing walkway surface supported on said load-bearing members and covering a portion of said shallow trench, said load-bearing walkway surface being permeable so as to allow water to percolate therethrough upon soil under the shallow trench, and at least one hinge connecting said cover member to at least one of said load-bearing members, whereby said cover member may be lifted on said hinge so as to temporarily uncover said trench portion to allow access thereto for adding nourishing elements to the soil thereunder.

6. The structure according to claim 5 and further including first and second temporary retaining edges extending to a second selected depth greater than said first selected depth below the soil level and temporarily serving as said shallow trench sidewalls along said first and second rows of spaced support piers, respectively.

7. The structure according to claim 6, wherein said first and second temporary retaining edges are biodegradable over time.

8. The structure according to claim 6 wherein said first and second temporary retaining edges are comprised of untreated lumber.

9. The structure according to claim 5, wherein said first selected depth is between 4 and 8 inches to allow for periodic additions of leaves to the shallow trench to provide mulch and nutrients to periodically nourish the soil under the shallow trench.

10. The structure according to claim 5, wherein said permeable load-bearing surface of said cover member comprises a perforated sheet attached to an upper frame and wherein said load-bearing members comprise a lower frame resting on said piers.

11. The structure according to claim 5, wherein said permeable load-bearing surface of said cover member comprises a plastic molding having perforated sheet portions and integral strengthening ribs.

12. The structure according to claim 5, wherein a plurality of said cover members are disposed end-to-end along said walkway.

* * * * *